US011184427B2

(12) United States Patent
Kulp et al.

(10) Patent No.: US 11,184,427 B2
(45) Date of Patent: *Nov. 23, 2021

(54) LOCAL MICROSERVICE DEVELOPMENT FOR REMOTE DEPLOYMENT

(71) Applicant: International Business Machines Corporation, Armonk, NY (US)

(72) Inventors: Richard L. Kulp, Cary, NC (US); Gili Mendel, Cary, NC (US); Brian W. Svihovec, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 66 days.

This patent is subject to a terminal disclaimer.

(21) Appl. No.: 16/686,984

(22) Filed: Nov. 18, 2019

(65) Prior Publication Data
US 2020/0112604 A1    Apr. 9, 2020

Related U.S. Application Data

(63) Continuation of application No. 15/401,456, filed on Jan. 19, 2017, now Pat. No. 10,574,736.

(51) Int. Cl.
| *H04L 29/08* | (2006.01) |
| *G06F 9/54* | (2006.01) |
| *H04L 29/06* | (2006.01) |

(52) U.S. Cl.
CPC .............. *H04L 67/10* (2013.01); *G06F 9/54* (2013.01); *H04L 67/02* (2013.01); *H04L 67/141* (2013.01); *H04L 67/42* (2013.01)

(58) Field of Classification Search
CPC ......... H04L 67/02; H04L 67/10; H04L 67/34; H04L 67/42; H04L 67/125; H04L 67/141;
(Continued)

(56) References Cited

U.S. PATENT DOCUMENTS 9,652,214 B1 *   5/2017   Eberlein ............. G06F 9/44526
9,703,680 B1     7/2017   Chang et al.
(Continued)

FOREIGN PATENT DOCUMENTS

| CN | 105162884 | 12/2015 |
| EP | 2254310 | 8/2014 |

OTHER PUBLICATIONS

Montesi F, Weber J. Circuit breakers, discovery, and API gateways in microservices. arXiv preprint arXiv: 1609.05830. Sep. 19, 2016. (Year: 2016 (Year: 2016).*

(Continued)

*Primary Examiner* — James N Fiorillo
(74) *Attorney, Agent, or Firm* — Yee & Associates, P.C.

(57) ABSTRACT

Managing microservice function requests is provided. A request originating from a browser of the computer to execute a function corresponding to a microservice locally deployed on the computer is received using a software development kit operating in the computer. The request to execute the function is routed to the microservice using a local reverse proxy running in the software development kit. Other requests originating from the browser of the computer to execute one or more other functions corresponding to one or more microservices in a remotely deployed microservice architecture that interact with the function corresponding to the microservice are received using the software development kit. The other requests to execute the one or more other functions corresponding to the one or more microservices in the remotely deployed microservice architecture are routed, via a single uniform resource locator corresponding to a remote reverse proxy, using the local reverse proxy.

20 Claims, 8 Drawing Sheets

(58) Field of Classification Search
CPC ..... H04L 67/1002; H04L 29/06; H04L 29/08; H04L 65/1069; G06F 9/54; G06F 9/541; G06F 8/30; G06F 8/60; G06F 16/95; G06F 9/46
USPC ......................................................... 709/223
See application file for complete search history.

(56) References Cited

U.S. PATENT DOCUMENTS

| | | | | |
|---|---|---|---|---|
| 9,983,860 | B1* | 5/2018 | Koty | H04L 67/10 |
| 2003/0040995 | A1* | 2/2003 | Daddario | G06Q 40/02 |
| | | | | 705/35 |
| 2005/0193222 | A1* | 9/2005 | Greene | H04L 63/102 |
| | | | | 726/5 |
| 2010/0169803 | A1 | 7/2010 | Mazzei et al. | |
| 2010/0299437 | A1* | 11/2010 | Moore | H04L 67/1008 |
| | | | | 709/226 |
| 2015/0081876 | A1* | 3/2015 | Pieczul | H04L 67/22 |
| | | | | 709/224 |
| 2015/0161681 | A1* | 6/2015 | Maes | G06F 9/541 |
| | | | | 705/14.72 |
| 2016/0080324 | A1* | 3/2016 | Cohen | H04L 63/0281 |
| | | | | 726/1 |
| 2016/0226871 | A1* | 8/2016 | Stephure | H04L 67/146 |
| 2017/0111336 | A1* | 4/2017 | Davis | H04L 67/02 |
| 2017/0187785 | A1* | 6/2017 | Johnson | H04L 67/10 |
| 2017/0192414 | A1* | 7/2017 | Mukkamala | H04L 63/0823 |
| 2017/0201425 | A1* | 7/2017 | Marinelli | G06Q 50/06 |
| 2017/0220011 | A1* | 8/2017 | Hart | G05B 19/0428 |
| 2018/0007059 | A1* | 1/2018 | Innes | G06F 21/6218 |
| 2018/0034924 | A1* | 2/2018 | Horwood | H04L 67/16 |
| 2018/0091440 | A1* | 3/2018 | Dadashikelayeh | G06F 16/25 |
| 2018/0114030 | A1* | 4/2018 | Sullivan | H04L 9/3226 |
| 2018/0115523 | A1* | 4/2018 | Subbarayan | H04L 63/02 |
| 2018/0152534 | A1* | 5/2018 | Kristiansson | H04L 67/1002 |
| 2018/0198845 | A1 | 7/2018 | Kulp et al. | |
| 2018/0300124 | A1* | 10/2018 | Malladi | G06F 9/542 |
| 2018/0315319 | A1* | 11/2018 | Spector | G06Q 10/06316 |
| 2019/0087835 | A1* | 3/2019 | Schwed | H04L 63/0414 |
| 2019/0294449 | A1* | 9/2019 | Leon | G06F 9/4416 |
| 2019/0327135 | A1* | 10/2019 | Johnson | H04L 67/34 |
| 2019/0373083 | A1* | 12/2019 | Nucci | H04W 12/35 |

OTHER PUBLICATIONS

Bryant, "Working Locally with Microservices: Microservice Platforms: Some Assembly [Still] Required, Part Two", OpenCredo, Sep. 20, 2015, 9 pages, https://opencredo.com/working-locally-with-microservices/.

"A sysem for running microservices in a container hosting environment with scale and failure recovery", IP.com, Prior Art Database Technical Disclosure No. IPCOM000246373D, Jun. 2, 2016, 4 pages.

Grace Period Disclosure, Kulp et al., "Console-Platform/console-platform-tools", International Business Machines Corporation, made publically available Aug. 1, 2016, 2 pages.

Mell et al., "The NIST Definition of Clound Computing", Computer Security Devision, National Institute of Standards and Technology, Jan. 2011, 7 pages.

* cited by examiner

LOCAL MICROSERVICE DEVELOPMENT FOR REMOTE DEPLOYMENT

CROSS-REFERENCE TO RELATED APPLICATION

This application is a continuation of and claims the benefit of priority to U.S. patent application Ser. No. 15/401,456, entitled "Local Microservice Development for Remote Deployment", filed Jan. 9, 2017, which is hereby incorporated by reference.

STATEMENT REGARDING PRIOR DISCLOSURES BY INVENTOR OR JOINT INVENTOR

The following disclosure is submitted under 35 U.S.C. 102(b)(1)(A): DISCLOSURE: "Console-Platform/console-platform-tools", Richard L. Kulp, Dr. Gili Mendel, Brian W. Svihovec, Aug. 1, 2016 made publically available, 2 pages.

BACKGROUND

1. Field

The disclosure relates generally to microservices and more specifically to managing local microservice development for deployment in a remote microservice architecture.

2. Description of the Related Art

Cloud computing technology is widely used in many domains, especially for distributed application deployment. Scalable, adaptable, modular, and quickly accessible cloud-based applications are now in high demand. As a result, application developers are changing their approach to application development and are now developing microservice architectures. A microservice architecture is a method of developing software applications as a suite of independently deployable, small, modular services in which each microservice runs a unique process and communicates through a well-defined, lightweight mechanism to serve a business goal. These microservices can be deployed, modified, and then redeployed independently without compromising the integrity of an application. Microservices receive requests, process them, and generate a response accordingly. When change is required in a certain part of the application, only the corresponding microservice needs to be modified and redeployed. In other words, there is no need to modify and redeploy the entire application. Also, if one microservice fails, the other mircoservices in the microservice architecture will continue to work.

Typically, a microservice architecture is composed of a multitude of microservices. In addition, each microservice is running as multiple instances of a Platform as a Service (PaaS) Node application. Further, each microservice is hooked up into a common session store for single sign on. Furthermore, all microservices in the microservice architecture are fronted by a reverse proxy. A reverse proxy is an application or computer system that retrieves resources on behalf of a local client from one or more remote servers. The reverse proxy may be located on the local client device. Fronting the microservices of the microservice architecture with a reverse proxy enables the entire microservice architecture to operate under a single uniform resource locator (URL). All microservices generate their own web pages for the set of functions each respective microservice is responsible for. There are two special microservices in a microservice architecture. One special microservice generates Hypertext Markup Language (HTML) and Cascade Style Sheets (CSS) for a context aware common header, common navigation, and common widgets for the microservices of the microservice architecture. Another special microservice is responsible for driving the login process with a login server. This login process generates a session token for the microservice architecture's reverse proxy URL and is shared by all microservices in the microservice architecture.

At development time, it is not practical for a developer to try and run all microservices of a microservice architecture on a local data processing system device due to size, specific configuration, permissions to access a particular microservice project, and microservice dependency on various PaaS services, such as databases, message queues, and the like. Also, it is not always practical to run a particular microservice by itself on a local data processing system device for the purpose of developing, modifying, or debugging. For example, that particular microservice may need to interact with other microservices, share the same session and single sign on context, and be bound to the same services that handle the rest of the microservices of the microservice architecture.

SUMMARY

According to one illustrative embodiment, a computer-implemented method for managing microservice function requests is provided. A computer receives a request originating from a browser of the computer to execute a function corresponding to a microservice locally deployed on the computer using a software development kit operating in the computer. The microservice locally deployed on the computer is a component of a microservice architecture remotely deployed in a remote-computing environment. The computer routes the request to execute the function to the microservice locally deployed on the computer using a local reverse proxy running in the software development kit. In addition, the computer receives other requests originating from the browser of the computer to execute one or more other functions corresponding to one or more microservices in the remotely deployed microservice architecture that interact with the function corresponding to the microservice locally deployed on the computer using the software development kit operating in the computer. The computer routes, via a single uniform resource locator corresponding to a remote reverse proxy, the other requests to execute the one or more other functions corresponding to the one or more microservices in the remotely deployed microservice architecture using the local reverse proxy running in the software development kit. According to other illustrative embodiments, a computer system and computer program product for managing microservice function requests are provided. As a result, the different illustrative embodiments allow a function of a locally deployed microservice on a computer to interact with one or more functions of one or more microservices remotely deployed on a set of one or more servers in a remote-computing environment for a user of the computer to develop the function, which is executing locally on the computer in the software development kit.

Further, the browser of the computer is agnostic as to a deployment location of any microservice either locally or remotely deployed. Furthermore, the browser of the computer generates a special hypertext transfer protocol header that refers to a local uniform resource locator corresponding to the local reverse proxy of the software development kit.

The local reverse proxy utilizes the special hypertext transfer protocol header when the local reverse proxy routes the other requests to the remote reverse proxy to indicate that the other requests are coming from the local reverse proxy of the software development kit. The remote reverse proxy utilizes the special hypertext transfer protocol header to enable the local reverse proxy of the software development kit running on the computer to interact with the one or more microservices remotely deployed. Moreover, the local reverse proxy running in the software development kit is able to route the other requests via the single uniform resource locator corresponding to the remote reverse proxy because the local reverse proxy has access to a session token linking the browser of the computer to the remote reverse proxy in a context of a single user login session.

DETAILED DESCRIPTION

Figure 1:
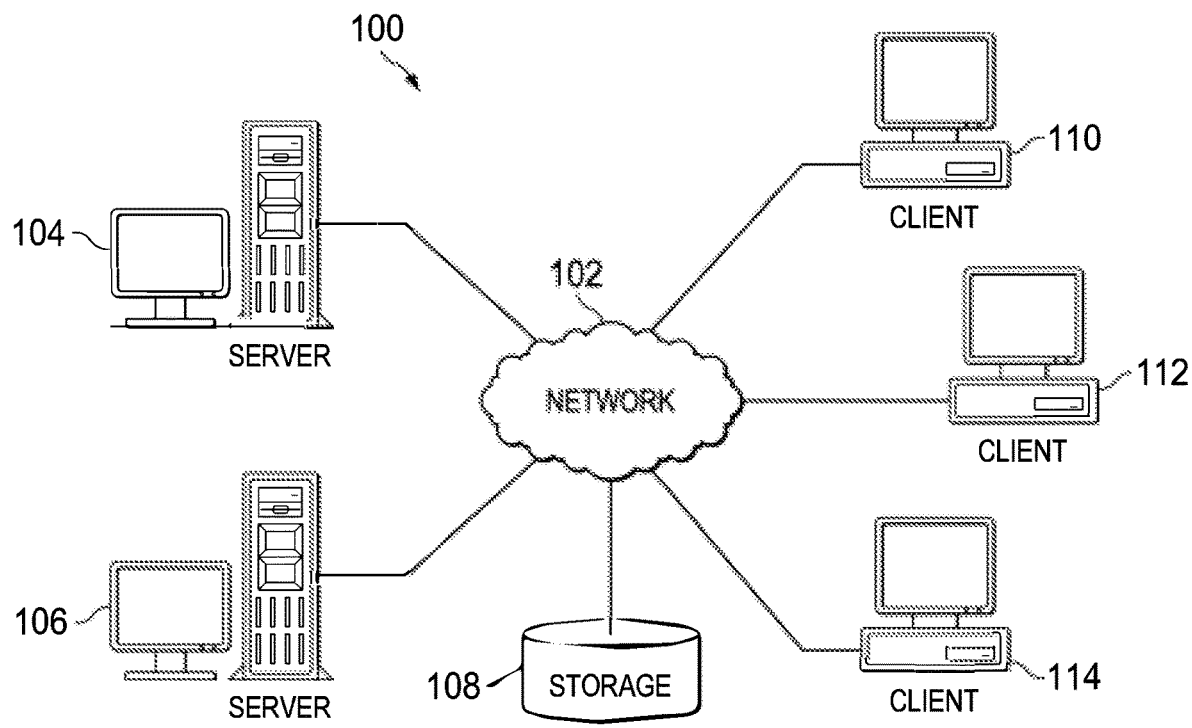
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of services corresponding to a microservice architecture comprising a plurality of different microservices. Also, it should be noted that server 104 and server 106 may each represent a plurality of servers hosting different microservice architectures that perform different services.

Client 110, client 112, and client 114 also connect to network 102. Clients 110, 112, and 114 are clients of server 104 and server 106. Clients 110, 112, and 114 may represent a plurality of workstations corresponding to a plurality of different users. The users may be, for example, application developers of microservice architectures.

Server 104 and server 106 may provide information, such as software applications and programs to clients 110, 112, and 114. In this example, clients 110, 112, and 114 each represent a local computing environment, such as a desktop computer, a laptop computer, handheld computer, and the like, that may run a locally deployed microservice of a microservice architecture. Respective users of clients 110, 112, and 114 may deploy a microservice in a software development kit operating on each of clients 110, 112, and 114 for development of one or more functions of a locally deployed microservice. In addition, the software development kit may include a local reverse proxy that fronts the locally deployed microservice in the software development kit. Clients 110, 112, and 114 may utilize the local reverse proxy to communicate with a remote reverse proxy running on server 104 or server 106 that is hosting a microservice architecture corresponding to respective locally deployed microservices.

Storage 108 is a network storage device capable of storing any type of data in a structured format or an unstructured format. In addition, storage 108 may represent a plurality of network storage devices. Further, storage 108 may store identifiers and uniform resource locators for a plurality of client devices, identifiers and uniform resource locators for a plurality of servers in a remote-computing environment, a plurality of different microservice architectures, microservice source code, software development kits, and the like. Furthermore, storage unit 108 may store other types of data, such as authentication or credential data that may include user names, passwords, and biometric data associated with application developers and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
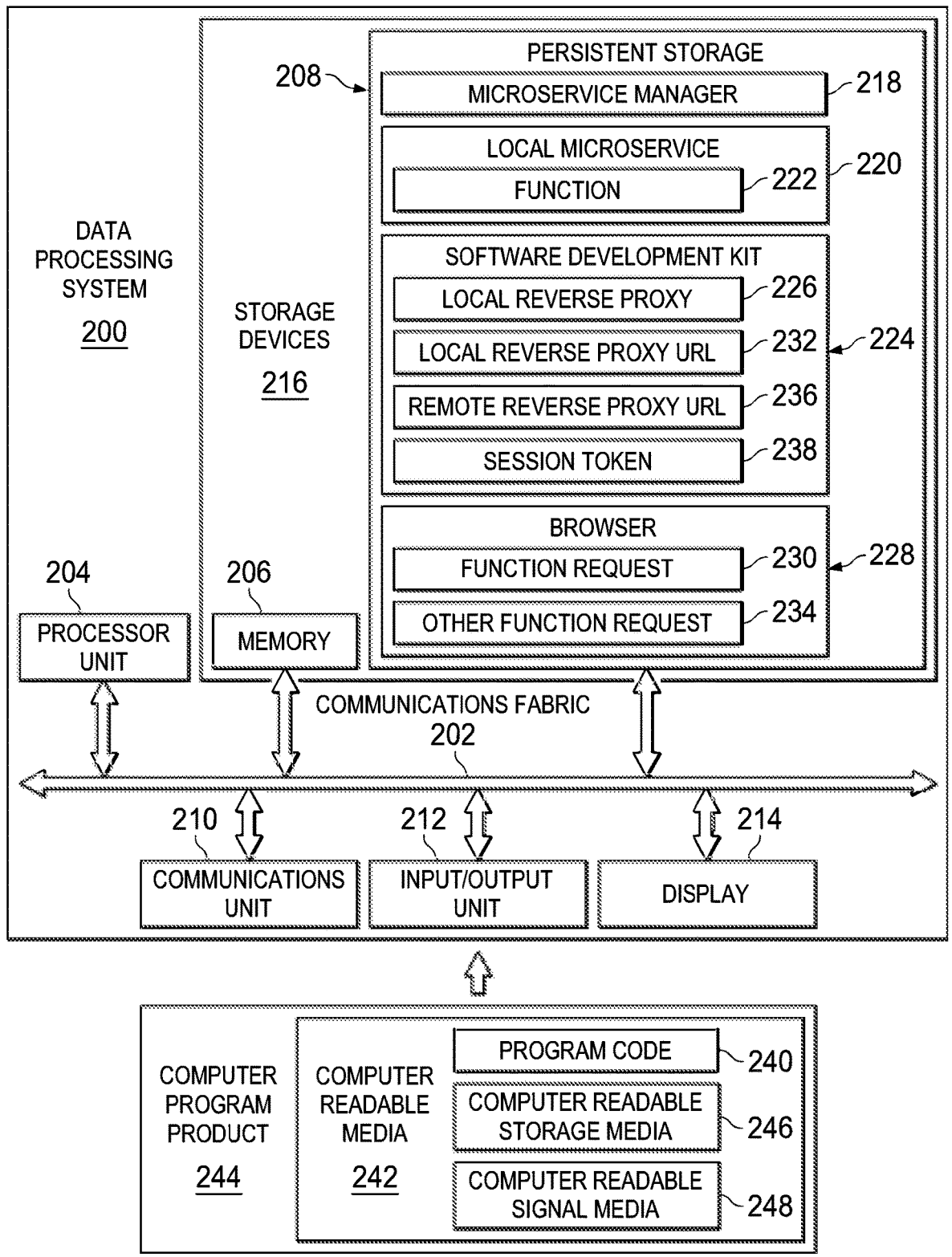
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores microservice manager 218. However, it should be noted that even though microservice manager 218 is illustrated as residing in persistent storage 208, in an alternative illustrative embodiment microservice manager 218 may be a separate component of data processing system 200. For example, microservice manager 218 may be a hardware component coupled to communication fabric 202 or a combination of hardware and software components.

Microservice manager 218 manages the development of local microservice 220 for deployment in a remote microservice architecture comprising a plurality of microservices that is deployed in a remote-computing environment, such as a cloud environment. Local microservice 220 represents a microservice of the remote microservice architecture that is locally deployed on data processing system 200. Local microservice 220 includes function 222. Function 222 represents a set of one or more functions performed by local microservice 220.

Microservice manager 218 deploys local microservice 220 in software development kit 224. Software development kit 224 provides a set of software development tools for generating and modifying functions of microservices, such as function 222 of microservice 220. Software development kit 224 includes local reverse proxy 226. Local reverse proxy 226 fronts and points to local microservice 220.

Browser 228 is a web browser application for retrieving and presenting information. A user, such as an application developer, of data processing system 200 may utilize browser 228 to make function request 230. Function request 230 is a call for microservice 220 to perform function 222. Browser 228 routes function request 230 to local reverse proxy uniform resource locator 232. Local reverse proxy uniform resource locator 232 corresponds to local reverse proxy 226 of software development kit 224.

The user of data processing system 200 also may utilize browser 228 to make other function request 234. Other function request 234 represents a set of one or more function requests to the other microservices comprising the remainder of the remotely deployed microservice architecture for performance of functions corresponding to one or more of the remotely deployed microservices. The remotely deployed microservice architecture may be located in a server, such as, for example, server 104 in FIG. 1. Browser 228 routes other function request 234 to remote reverse proxy uniform resource locator 236. Remote reverse proxy uniform resource locator 236 corresponds to a remote reverse proxy located, for example, on the server hosting the remotely deployed microservice architecture. The remote reverse proxy fronts and points to the remainder of the microservices of the microservice architecture remotely deployed in the remote-computing environment. Browser 228 is able to route other function request 234 to remote reverse proxy uniform resource locator 236 because local reverse proxy 226 has access to session token 238, which links browser 228 to the remote reverse proxy in a context of a single user login session.

Thus, the user of data processing system 200 is able to make other function request 234 to the remotely deployed microservices, as well as, function request 230 to local microservice 220. This is a significant aspect of illustrative embodiments because function 222 of local microservice 220 may need to interact with functions of one or more microservices remotely deployed in the remote-computing environment for the user of data processing system 200 to properly develop function 222, which is executing locally on data processing system 200.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information, such as a locally deployed microservice under development in a software development kit, to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 240 is located in a functional form on computer readable media 242 that is selectively removable and may be loaded onto or transferred to data processing system 200 for running by processor unit 204. Program code 240 and computer readable media 242 form computer program product 244. In one example, computer readable media 242 may be computer readable storage media 246 or computer readable signal media 248. Computer readable storage media 246 may include, for example, an optical or magnetic disc that is inserted or placed into a drive or other device that is part of persistent storage 208 for transfer onto a storage device, such as a hard drive, that is part of persistent storage 208. Computer readable storage media 246 also may take the form of a persistent storage, such as a hard drive, a thumb drive, or a flash memory that is connected to data processing system 200. In some instances, computer readable storage media 246 may not be removable from data processing system 200.

Alternatively, program code 240 may be transferred to data processing system 200 using computer readable signal media 248. Computer readable signal media 248 may be, for example, a propagated data signal containing program code 240. For example, computer readable signal media 248 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 240 may be downloaded over a network to persistent storage 208 from another device or data processing system through computer readable signal media 248 for use within data processing system 200. For instance, program code stored in a computer readable storage media in a data processing system may be downloaded over a network from the data processing system to data processing system 200. The data processing system providing program code 240 may be a server computer, a client computer, or some other device capable of storing and transmitting program code 240.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 246 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
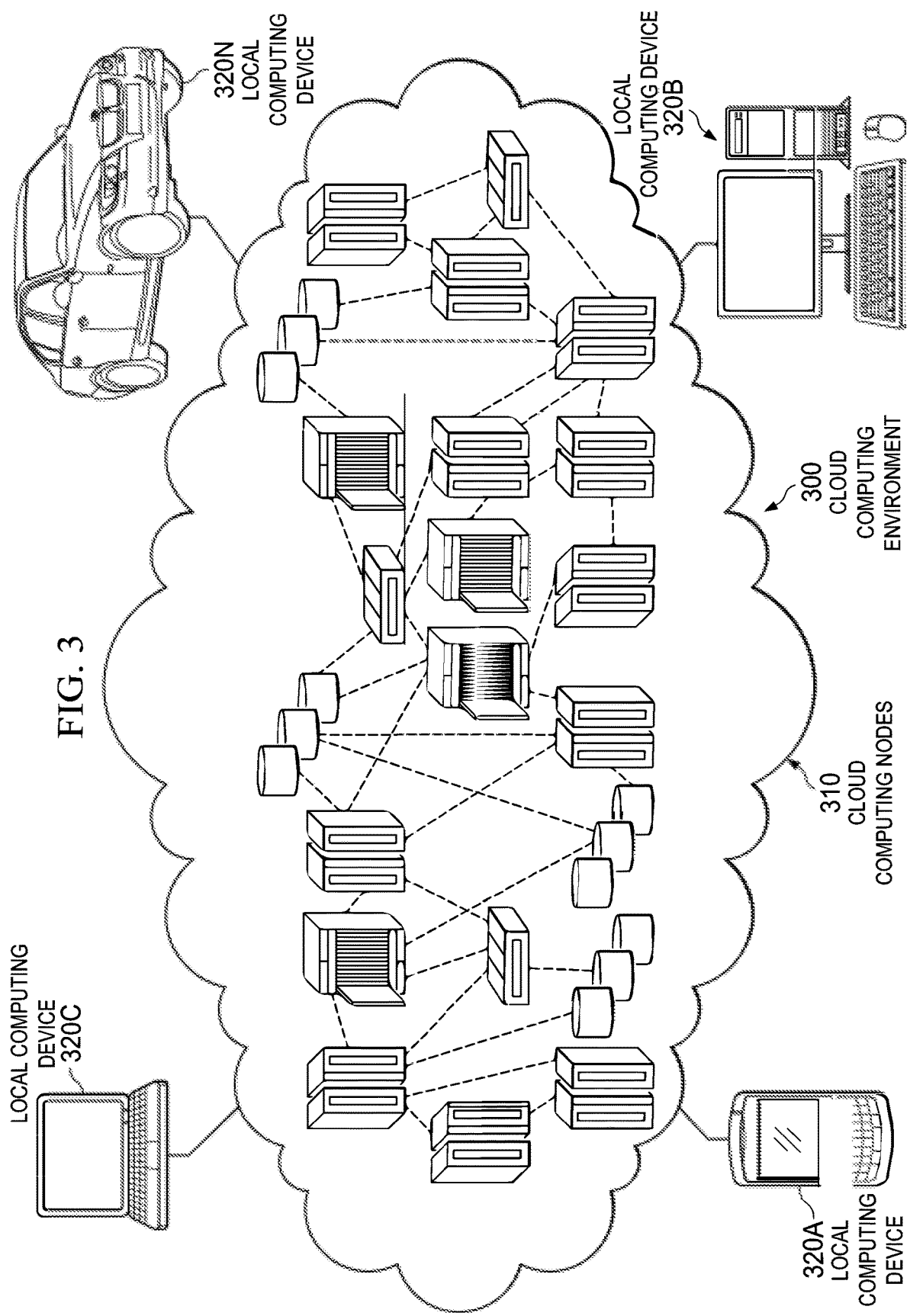
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
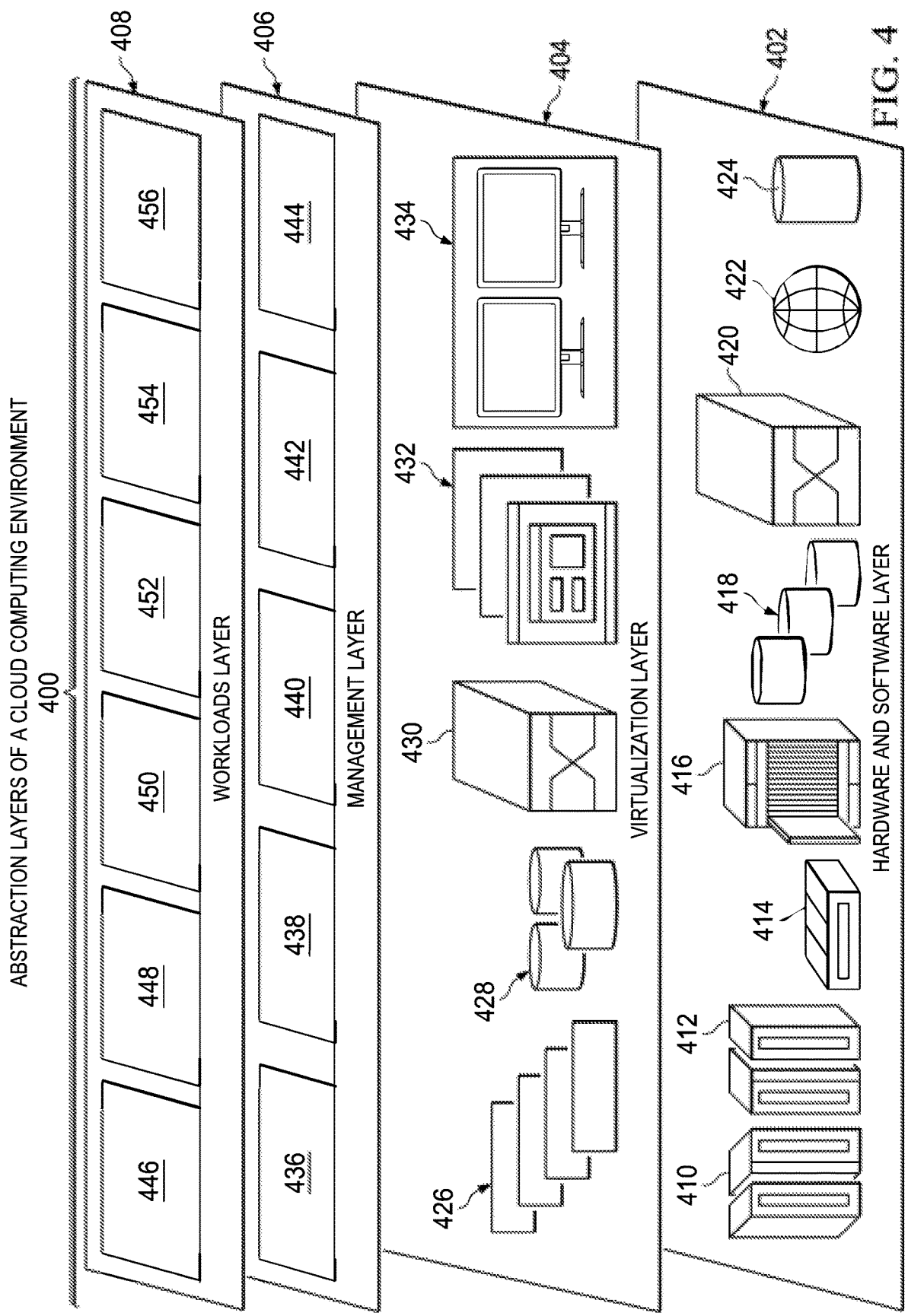
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 includes hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and microservice architecture management 456.

Illustrative embodiments generate a software development kit (SDK) on a computer of a local computing environment to enable a microservice development environment on the local computer. Using the software development kit on the local computer, a developer only needs to locally deploy and run a selected microservice, which the developer wants to develop, modify, or debug, that is part of a microservice architecture comprising a plurality of microservices. The remainder of the plurality of microservices in the microservice architecture is those microservices that were previously deployed on one or more servers in a remote-computing environment, such as, for example, a cloud environment or a data center environment.

In addition, illustrative embodiments include a local reverse proxy in the software development kit. The software development kit runs the local reverse proxy on the local computer. The local reverse proxy fronts and points to the locally deployed microservice for calls to a set of one or more functions of the locally deployed microservice under development or modification. For calls to functions of microservices in the reminder of the plurality of microservices in the microservice architecture, the software development kit points to a remote reverse proxy on a server in the remote-computing environment.

If a browser of the local computer points to the local uniform resource locator corresponding to the local reverse proxy of the software development kit, then the browser will route any function call or request destined to the locally deployed microservice under development to the local uniform resource locator corresponding to the local reverse proxy of the software development kit. The browser routes any function calls or requests corresponding to remotely deployed microservices of the microservice architecture to a remote reverse proxy located on a server in the remote-computing environment. When the browser sends the function calls or requests corresponding to the remotely deployed microservices to the remote reverse proxy, the browser will also send a special Hypertext Transfer Protocol (HTTP) header referring to the local uniform resource locator corresponding to the local reverse proxy of the software development kit. The local reverse proxy utilizes the special HTTP header when the local reverse proxy routes function calls or requests to the remote-computing environment to indicate that the function call or request is coming from the local reverse proxy of the software development kit. The remote reverse proxy in the remote-computing environment utilizes the special HTTP header to enable the local reverse proxy of the software development kit running on the local computer to interact and participate with the remotely deployed microservices of the microservice architecture.

One complexity with a developer using a local computer is that as the developer interacts with one or more of the remotely deployed microservices of the microservice architecture via the local reverse proxy of the software development kit running on the local computer, the microservice architecture's uniform resource locator, which impacts session cookies, is the local computer's uniform resource locator (e.g., http://localcomputer:3000). This local computer uniform resource locator is not available to remaining remotely deployed microservices running on the remote-computing environment, when a call back is needed for such things as a login process using a type of authentication, such as, for example, OAuth. OAuth is an open standard for authorization commonly used as a way for Internet users to authorize websites and applications to access their information on other websites without giving them a credential or password.

An issue with the login process using a single sign on (SSO) from the local computer is that the browser of the local computer only works with a given domain. If the given domain corresponds to the local uniform resource locator corresponding to the local reverse proxy of the software development kit running on the local computer, then a session cookie, for example, will only work with the local uniform resource locator corresponding to the local reverse proxy of the software development kit and not the remote uniform resource locator corresponding to the remote reverse proxy in the remote-computing environment, and vice versa. The remotely deployed microservice architecture and the login server, which the remotely deployed microservice architecture authenticates with, are configured to understand the remote reverse proxy uniform resource locator (e.g., https://remote.ng.platform.net). The remotely deployed microservice architecture and the login server do not understand the local computer's uniform resource locator (e.g., http://localcomputer:3000). When the session cookie, for example, is set, the session cookie is set on the given domain the browser is pointing to (e.g., http://localcomputer:3000).

Illustrative embodiments enable the local reverse proxy of the software development kit running on the local computer to work with the remote reverse proxy running in the remote-computing environment to allow the login server to authenticate the developer on the local computer for interaction with one or more of the remotely deployed microservices in the microservice architecture. Illustrative embodiments re-route the browser of the local computer so that when the session is created, the session is created for the local computer domain, even though the login server does not recognize the uniform resource locator corresponding to the local reverse proxy of the software development kit running on the local computer. Illustrative embodiments utilize a software development kit configuration where the only microservice that runs locally on the local computer is a "local microservice". All other microservices in the microservice architecture are remotely deployed and run on a set of one or more servers in the remote-computing environment. The local reverse proxy of the software development kit routes function calls or requests to the local microservice locally and routes every other function call or request corresponding to one or more of the remotely deployed microservices in the microservice architecture to the remote reverse proxy running in the remote-computing environment. Also, it should be noted that the login server interacts with the remote reverse proxy only.

Figure 5:
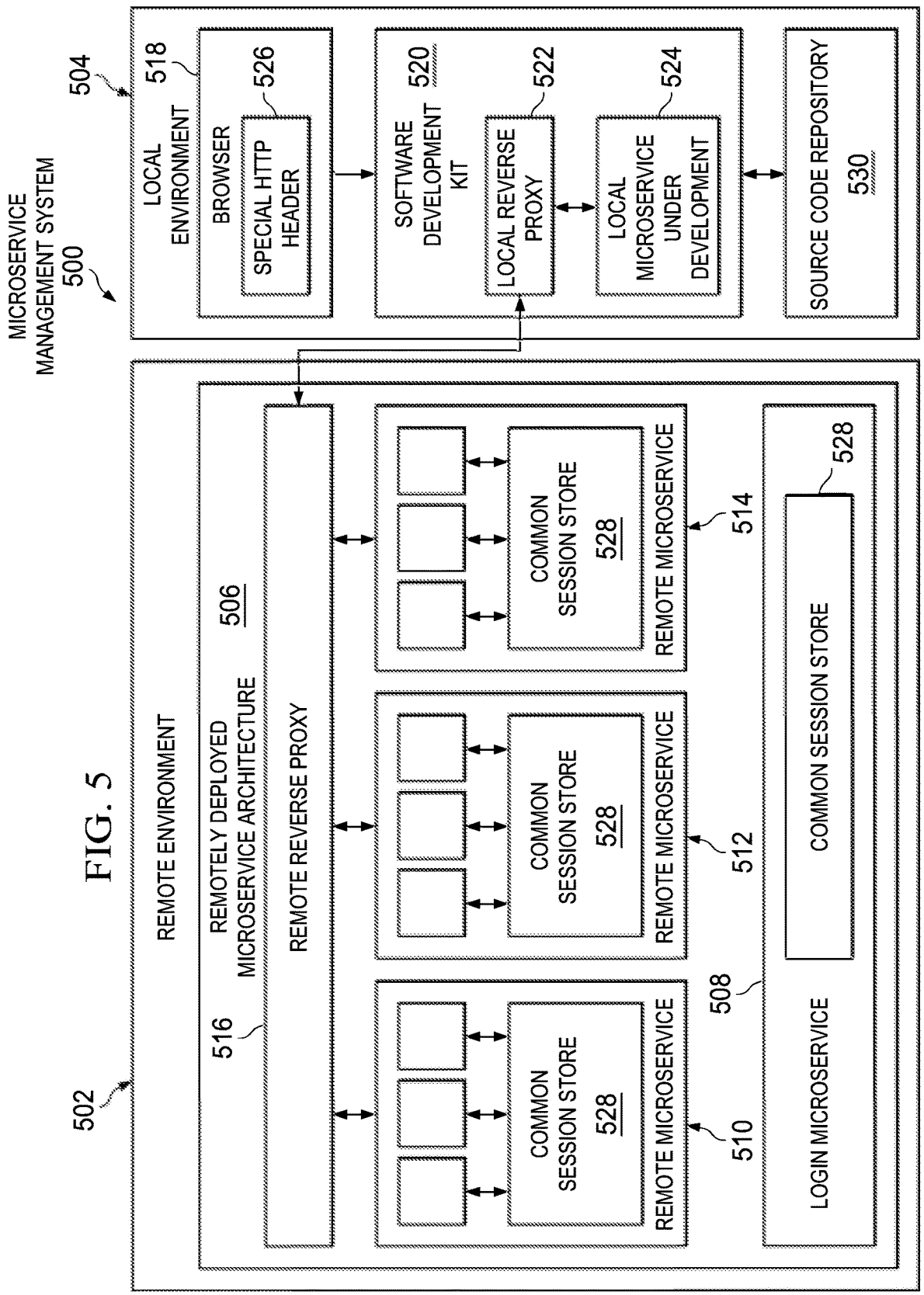
FIG. 5 is a diagram illustrating an example of a microservice management system in accordance with an illustrative embodiment.

With reference now to FIG. 5, a diagram illustrating an example of a microservice management system is depicted in accordance with an illustrative embodiment. Microservice management system 500 may be implemented in a network of data processing systems, such as network data processing system 100 in FIG. 1, or a cloud computing environment, such as cloud computing environment 300 in FIG. 3. Microservice management system 500 is a system of hardware and software components for managing local microservice development for remote deployment in a microservice architecture located in a remote-computing environment.

In this example, microservice management system 500 includes remote environment 502 and local environment 504. Remote environment 502 represents a remote-computing environment, such as, for example, a cloud computing environment or a data center computing environment.

Remote environment 502 includes remotely deployed microservice architecture 506. Remotely deployed microservice architecture 506 represents a microservice architecture comprising a multitude of different microservices that perform a plurality of different functions.

In this example, remotely deployed microservice architecture 506 includes login microservice 508, remote microservice 510, remote microservice 512, and remote microservice 514. However, it should be noted that remotely deployed microservice architecture 506 is only intended as an example and may include any number and any type of microservices. Login microservice 508 represents a special type of microservice that performs the login process with a login server. This login process generates a session token, such as session token 238 in FIG. 2, for the uniform resource locator corresponding to remote reverse proxy 516 of remotely deployed microservice architecture 506. This session token is shared by all microservices (i.e., remote microservice 510, remote microservice 512, and remote microservice 514) in remotely deployed microservice architecture 506. Remote reverse proxy 516 fronts and points to remote microservice 510, remote microservice 512, and remote microservice 514. It should be noted that each of remote microservice 510, remote microservice 512, and remote microservice 514 is running as multiple instances.

Local environment 504 represents a local computing environment, such as, for example, data processing system 200 in FIG. 2. Local environment 504 includes browser 518 and software development kit 520, such as browser 228 and software development kit 224 in FIG. 2. Software development kit 520 includes local reverse proxy 522, such as local reverse proxy 226 in FIG. 2. Local reverse proxy 522 communicates with remote reverse proxy 516.

A user, such as an application developer, of local environment 504 deploys local microservice under development 524 in software development kit 520. Local microservice under development 524 may be, for example, local microservice 220 in FIG. 2. In addition, local microservice under development 524 may correspond to one of the microservices, such as remote microservice 514, of remotely deployed microservice architecture 506. The user of local environment 504 utilizes browser 518 to make a function request, such as function request 230 in FIG. 2, of local microservice under development 524. Browser 518 routes the function request to the uniform resource locator corresponding to local reverse proxy 522.

In addition, the user of local environment 504 also utilizes browser 518 to make other function requests, such as other function request 234 in FIG. 2, of remote microservice 510, remote microservice 512, and/or remote microservice 514. Browser 518 routes the other function requests to the uniform resource locator corresponding to remote reverse proxy 516. Further, browser 518 generates and sends special HTTP header 526 with the other function requests. It should be noted that browser 518 is agnostic (i.e., knows nothing or cannot know) as to the deployment location of any of the microservices, either locally or remotely deployed.

Special HTTP header 526 refers to the uniform resource locator corresponding to local reverse proxy 522 of software development kit 520. Local reverse proxy 522 utilizes special HTTP header 526 when local reverse proxy 522 routes the other function requests to remote reverse proxy 516 to indicate that the other function requests are coming from local reverse proxy 522. Remote reverse proxy 516 utilizes special HTTP header 526 to enable local reverse proxy 522 to interact with remote microservice 510, remote microservice 512, and/or remote microservice 514. It should be noted that each of remote microservice 510, remote microservice 512, and remote microservice 514 is hooked up into common session store 528 for single sign on.

After completing development or modification of local microservice under development 524, the user of local environment 504 may store the source code corresponding to local microservice under development 524 in source code repository 530. Source code repository 530 may be located in a local storage device, such as persistent storage 208 in FIG. 2, or in a remote storage device, such as storage 108 in FIG. 1.

Figure 6A:
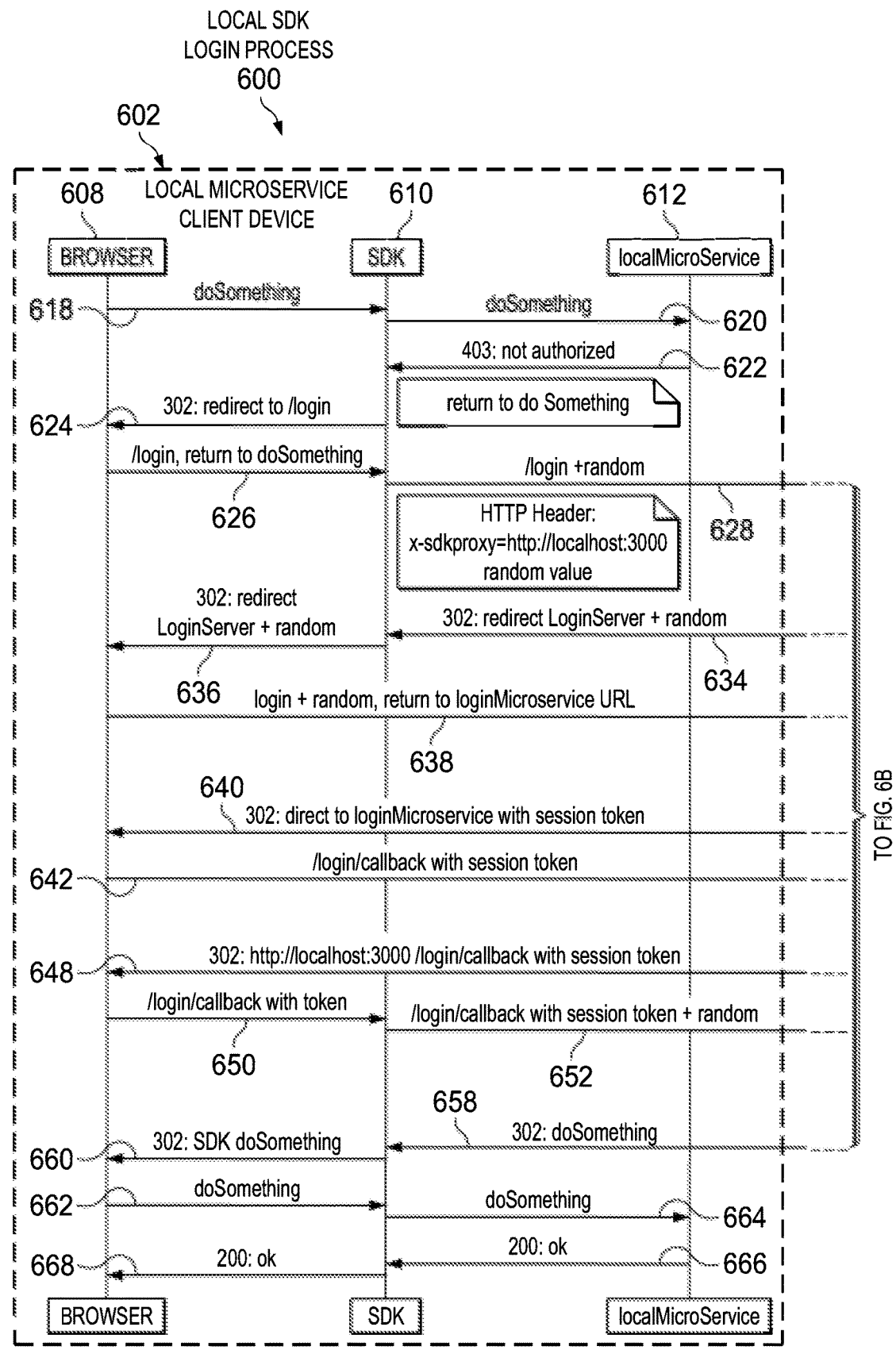
FIGS. 6A-6B are a diagram illustrating an example of a local software development kit login process in accordance with an illustrative embodiment.
Figure 6B:
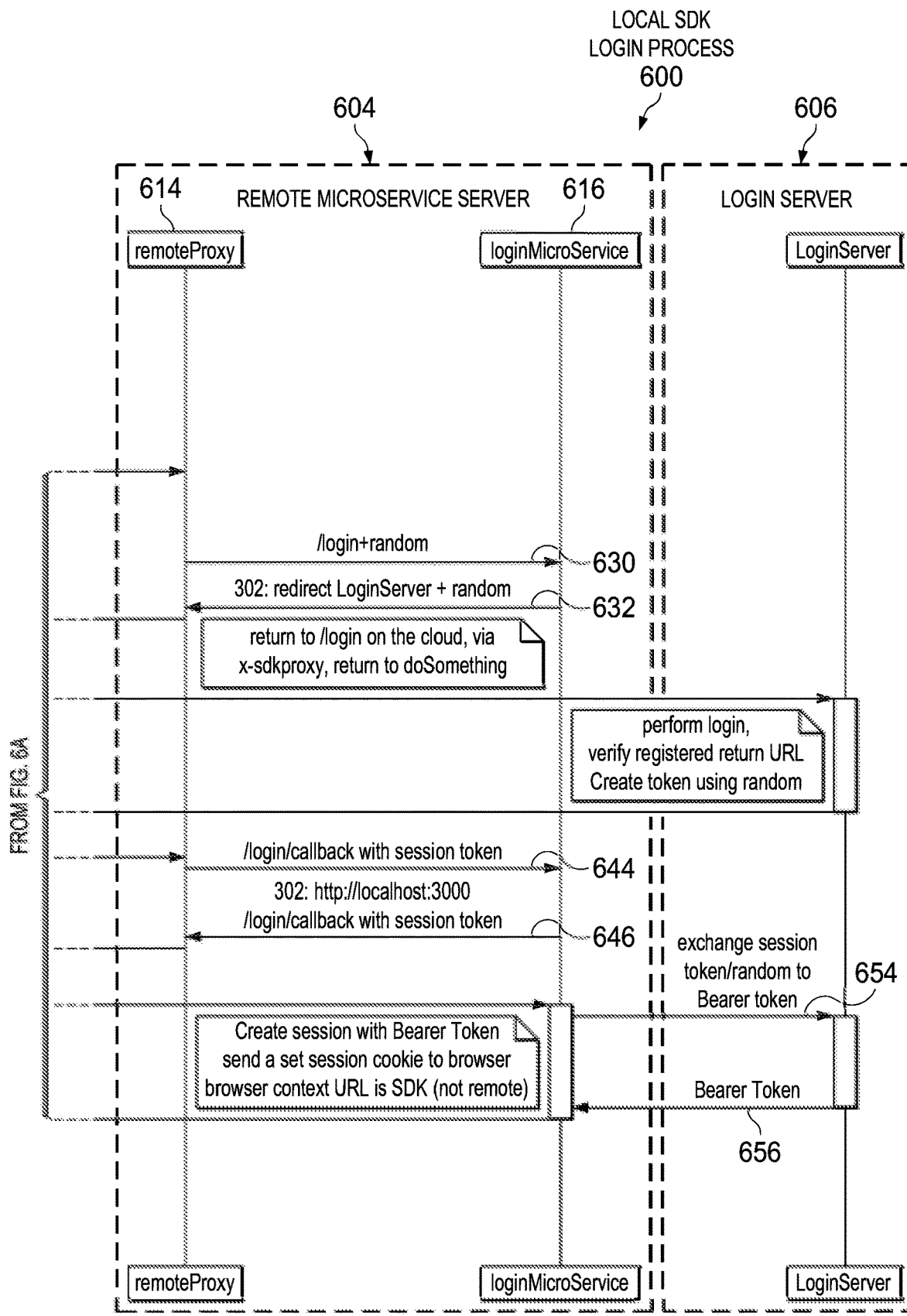

With reference now to FIGS. 6A-6B, a diagram illustrating an example of a local software development kit login process is depicted in accordance with an illustrative embodiment. Local software development kit login process 600 may be implemented in a network of data processing systems, such as network data processing system 100 in FIG. 1, or a cloud computing environment, such as cloud computing environment 300 in FIG. 3. Local software development kit login process 600 illustrates the login process between local microservice client device 602, remote microservice server 604, and login server 606.

Local microservice client device 602 may be, for example, client 110 in FIG. 1, data processing system 200 in FIG. 2, or local environment 504 in FIG. 5. Remote microservice server 604 may be, for example, server 104 in FIG. 1 or remote environment 502 in FIG. 5. Login server 606 may be, for example, a cloud computing node in cloud computing nodes 310 in FIG. 3.

In this example, local microservice client device 602 includes browser 608, software development kit (SDK) 610, and local microservice 612, such as browser 518, software development kit 520, and local microservice under development 524 in FIG. 5. Remote microservice server 604 includes remote reverse proxy 614 and login microservice 616, such as remote reverse proxy 516 and login microservice 508 in FIG. 5.

In this example, local software development kit login process 600 includes steps 618-668. However, it should be noted that local software development kit login process 600 is only intended as an example and not as a limitation on illustrative embodiments. For example, local software development kit login process 600 may include more or fewer steps than illustrated.

At 618, browser 608 sends a function request or call of "do something" to local microservice 612 via software development kit 610. The function request may be, for example, function request 230 in FIG. 2. It should be noted that software development kit 610 includes a local reverse proxy, such as local reverse proxy 522 in FIG. 5, which fronts and points to local microservice 612. In addition, local microservice 612 is locally deployed in software development kit 610.

At 620, software development kit 610 forwards the function request of do something to local microservice 612 via the local reverse proxy of software development kit 610. In response, at 622, local microservice 612 sends a response status code of 403 to software development kit 610 indicating that the function request is "not authorized" or forbidden. In turn, at 624, software development kit 610 sends a response status code of 302 to browser 608 indicating "redirect to login" or that the data requested resides under a different uniform resource locator.

At 626, browser 608 generates a special HTTP header, such as special HTTP header 526 in FIG. 5, which refers to the uniform resource locator corresponding to the local reverse proxy of software development kit 610, and sends the special HTTP header and login request to the local reverse proxy of software development kit 610. At 628, the local reverse proxy of software development kit 610 sends the special HTTP header and login request to remote reverse proxy 614. At 630, remote reverse proxy 614 forwards the special HTTP header and login request to login microservice 616.

At 632, login microservice 616 sends a response status code of 302 indicating "redirect Login Server" with the uniform resource locator of login microservice 616. At 634, remote reverse proxy 614 redirects the login to login server 606 with the uniform resource locator of login microservice 616 via the local reverse proxy of software development kit 610. At 636, the local reverse proxy of software development kit 610 sends the login to login server 606 with the uniform resource locator of login microservice 616 to browser 608.

At 638, browser 608 sends the login to login server 606 with the uniform resource locator of login microservice 616 to login server 606. Login server 606 performs the login and generates a session token, such as session token 238 in FIG. 2, using information in the special HTTP header. At 640, login server 606 sends response status code 302 to browser 608 indicating "redirect to login microservice with session token".

At 642, browser 608 sends a login call back with the session token to remote reverse proxy 614. At 644, remote reverse proxy 614 forwards the login call back with the session token to login microservice 616. At 646, login microservice 616 sends response status code 302 indicating "http://localcomputer:3000/login/callback with session token". In this example, http://localcomputer:3000 represents the uniform resource locator corresponding to the local reverse proxy of software development kit 610.

At 648, remote reverse proxy 614 send the uniform resource locator corresponding to the local reverse proxy of software development kit 610, the login call back, and the session token to browser 608. At 650, browser 608 sends the login call back with the session token to the local reverse proxy of software development kit 610. At 652, the local reverse proxy of software development kit 610 sends the login call back with the session token to login microservice 616.

At 654, login microservice 616 sends a request to login server 606 to exchange the session token to a bearer token. At 656, login server 606 sends the bearer token to login microservice 616. In response, login microservice 616 generates a session using the bearer token and sets a session cookie to a context of the uniform resource locator corresponding to the local reverse proxy of software development kit 610. At 658, login microservice 616 sends the set session cookie to the local reverse proxy of software development kit 610.

At 660, software development kit 610 sends response status code 302 indicating "SDK do something" to browser 608. At 662, browser 608 sends do something function request to the local reverse proxy of software development kit 610. At 664, the local reverse proxy of software development kit 610 forwards the do something function request to local microservice 612. At 666, local microservice 612 sends a response status code of 200 to the local reverse proxy of software development kit 610 indicating "OK" or that the function request was fulfilled. At 668, the local reverse proxy of software development kit 610 sends the function request fulfillment to browser 608.

Figure 7:
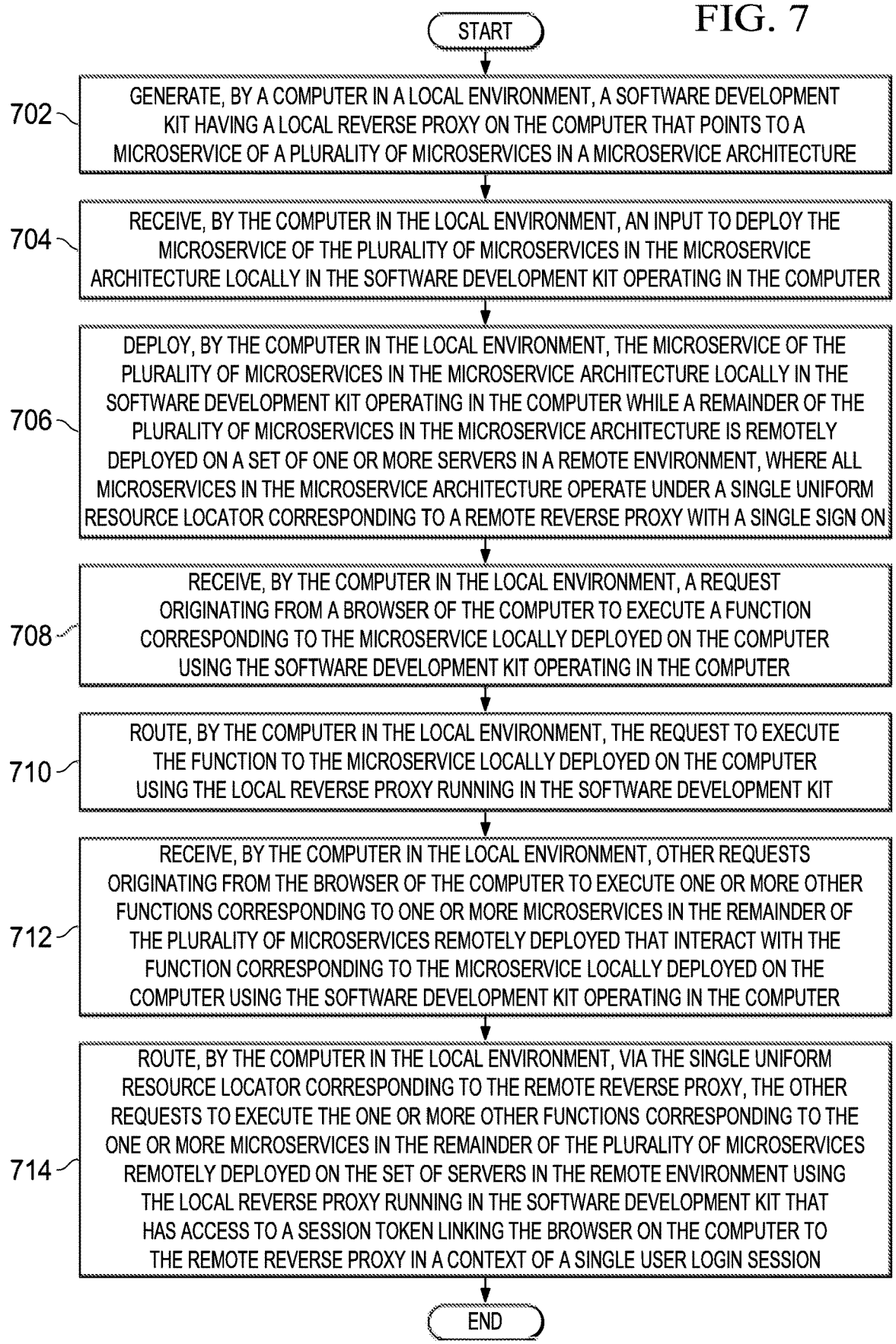
FIG. 7 is a flowchart illustrating a process for managing local browser requests for microservice functions in accordance with an illustrative embodiment.

With reference now to FIG. 7, a flowchart illustrating a process for managing local browser requests for microservice functions is shown in accordance with an illustrative embodiment. The process shown in FIG. 7 may be implemented in a computer, such as, for example, client 110 in FIG. 1, data processing system 200 in FIG. 2, or local computing device 320B in FIG. 3.

The process begins when the computer in a local environment generates a software development kit having a local reverse proxy on the computer that points to a microservice of a plurality of microservices in a microservice architecture (step 702). Subsequently, the computer in the local environment receives an input to deploy the microservice of the plurality of microservices in the microservice architecture locally in the software development kit operating in the computer (step 704). Afterward, the computer in the local environment deploys the microservice of the plurality of microservices in the microservice architecture locally in the software development kit operating in the computer while a remainder of the plurality of microservices in the microservice architecture is remotely deployed on a set of one or more servers in a remote environment (step 706). All of the microservices in the microservice architecture operate under a single uniform resource locator corresponding to a remote reverse proxy with a single sign on.

Then, the computer in the local environment receives a request originating from a browser of the computer to execute a function corresponding to the microservice locally deployed on the computer using the software development kit operating in the computer (step 708). The computer in the local environment routes the request to execute the function to the microservice locally deployed on the computer using the local reverse proxy running in the software development kit (step 710).

The computer in the local environment also receives other requests originating from the browser of the computer to execute one or more other functions corresponding to one or more microservices in the remainder of the plurality of microservices remotely deployed that interact with the function corresponding to the microservice locally deployed on the computer using the software development kit operating in the computer (step 712). The computer in the local environment routes, via the single uniform resource locator corresponding to the remote reverse proxy, the other requests to execute the one or more other functions corresponding to the one or more microservices in the remainder of the plurality of microservices remotely deployed on the set of servers in the remote environment using the local reverse proxy running in the software development kit that has access to a session token linking the browser on the computer to the remote reverse proxy in a context of a single user login session (step 714). Thereafter, the process terminates.

Thus, illustrative embodiments of the present invention provide a computer-implemented method, computer system, and computer program product for managing local microservice development for deployment in a remote microservice architecture. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   managing microservice function requests by a computer:
      receiving a request originating from a browser to execute a function corresponding to a microservice locally deployed on the computer using a software development kit operating in the computer, wherein:
      the microservice locally deployed on the computer is a component of a microservice architecture remotely deployed in a remote-computing environment;
      a remote reverse proxy fronts and points to the plurality of the microservices of the microservice architecture remotely deployed in the remote-computing environment;
      a local reverse proxy running in the software development kit has access to a session token linking the browser of the computer to the remote reverse proxy in a context of a single user login session; and
      the local reverse proxy running in the software development kit is configured to route other requests via a single uniform resource locator corresponding to the remote reverse proxy.

2. The method of claim 1, wherein the browser of the computer generates a hypertext transfer protocol header that refers to a local uniform resource locator corresponding to the local reverse proxy of the software development kit.

3. The method of claim 2, wherein the local reverse proxy utilizes the hypertext transfer protocol header when the local reverse proxy routes the other requests to the remote reverse proxy to indicate that the other requests are coming from the local reverse proxy of the software development kit.

4. The method of claim 2, wherein the remote reverse proxy utilizes the hypertext transfer protocol header to enable the local reverse proxy of the software development kit running on the computer to interact with one or more microservices remotely deployed.

5. The method of claim 1 further comprising:
   generating the software development kit having the local reverse proxy that fronts and points to the microservice locally deployed on the computer.

6. The method of claim 1 further comprising:
   receiving an input to deploy the microservice locally in the software development kit operating in the computer; and
   deploying the microservice locally in the software development kit operating in the computer while one or more microservices are remotely deployed on a set of one or more servers in the remote-computing environment.

7. The method of claim 1, wherein the browser of the computer is agnostic with respect to a deployment location of any microservice either locally deployed or remotely deployed.

8. The method of claim 1, wherein the local reverse proxy running in the software development kit is configured to route the other requests via the single uniform resource locator corresponding to the remote reverse proxy as a result of the local reverse proxy having access to a session token linking the browser of the computer to the remote reverse proxy in a context of a single user login session.

9. The method of claim 1, wherein the microservice locally deployed on the computer is one of a plurality of microservices in the microservice architecture remotely deployed in the remote-computing environment.

10. The method of claim 1, wherein the remote-computing environment is a cloud computing environment.

11. A computer system comprising:
    a bus system;
    a storage device in communication with the bus system, wherein the storage device includes program instructions; and
    a processor in communication with the bus system, wherein the processor executes the program instructions to manage microservice function requests by:
       receiving a request originating from a browser of the computer system to execute a function corresponding to a microservice locally deployed on the computer system using a software development kit operating in the computer system; and
       routing the request to execute the function to the microservice locally deployed on the computer system using a local reverse proxy running in the software development kit, wherein the local reverse proxy fronts and points to a plurality of microservices in a microservice architecture remotely deployed in a remote-computing environment;
    wherein:
       the microservice locally deployed on the computer system is a component of the microservice architecture remotely deployed in the remote-computing environment;
       a remote reverse proxy fronts and points to the plurality of the microservices of the microservice architecture remotely deployed in the remote-computing environment;
       the local reverse proxy running in the software development kit is configured to route other requests via a single uniform resource locator corresponding to the remote reverse proxy; and
       the local reverse proxy running in the software development kit has access to a session token linking the browser of the computer system to the remote reverse proxy in a context of a single user login session.

12. The computer system of claim 11, wherein the processor further executes the program instructions to:
    generate the software development kit having the local reverse proxy that fronts and points to the microservice locally deployed on the computer system.

13. The computer system of claim 11, wherein the processor further executes the program instructions to:
    receive an input to deploy the microservice locally in the software development kit operating in the computer system; and
    deploy the microservice locally in the software development kit operating in the computer system while one or more microservices are remotely deployed on a set of one or more servers in the remote-computing environment.

14. The computer system of claim 11, wherein the browser of the computer system is agnostic as to a deployment location of any microservice either locally deployed or remotely deployed.

15. The computer system of claim 11, wherein the browser of the computer system generates a hypertext transfer protocol header that refers to a local uniform resource locator corresponding to the local reverse proxy of the software development kit.

16. A computer program product comprising:
    one or more computer-readable media including instructions for managing microservice function requests, wherein:

the one or more computer-readable media are not transitory; and the instructions comprise:

first program code for receiving a request originating from a browser of a computer to execute a function corresponding to a microservice locally deployed on the computer using a software development kit operating in the computer, wherein the microservice locally deployed on the computer is a component of a microservice architecture remotely deployed in a remote-computing environment;

second program code for routing the request to execute the function to the microservice locally deployed on the computer using a local reverse proxy running in the software development kit, wherein the local reverse proxy fronts and points to a plurality of microservices in the microservice architecture remotely deployed in the remote-computing environment; and third program code for receiving other requests originating from the browser of the computer to execute one or more other functions corresponding to one or more microservices in the microservice architecture remotely deployed in the remote-computing environment;

wherein:

the microservice architecture interacts with the function corresponding to the microservice locally deployed on the computer using the software development kit operating in the computer;

a remote reverse proxy fronts and points to the plurality of the microservices of the microservice architecture remotely deployed in the remote-computing environment;

the local reverse proxy running in the software development kit is configured to route the other requests via a single uniform resource locator corresponding to the remote reverse proxy; and the local reverse proxy running in the software development kit has access to a session token linking the browser of the computer to the remote reverse proxy in a context of a single user login session.

17. The computer program product of claim 16, wherein the instructions further comprise:

fourth program code for generating the software development kit having the local reverse proxy that fronts and points to the microservice locally deployed on the computer.

18. The computer program product of claim 16, wherein the instructions further comprise:

fourth program code for receiving an input to deploy the microservice locally in the software development kit operating in the computer; and fifth program code for deploying the microservice locally in the software development kit operating in the computer while the one or more microservices are remotely deployed on a set of one or more servers in the remote-computing environment.

19. The computer program product of claim 16, wherein the browser of the computer is agnostic as to a deployment location of any microservice either locally deployed or remotely deployed.

20. The computer program product of claim 16, wherein the browser of the computer generates a hypertext transfer protocol header that refers to a local uniform resource locator corresponding to the local reverse proxy of the software development kit.

* * * * *